United States Patent [19]

Henderson

[11] 4,125,231

[45] Nov. 14, 1978

[54] EMERGENCY LOCKING RETRACTOR WITH COMFORT BELT TENSION

[75] Inventor: Cyril Henderson, Valencia, Calif.

[73] Assignee: American Safety Equipment Corporation, Encino, Calif.

[21] Appl. No.: 772,649

[22] Filed: Feb. 28, 1977

Related U.S. Application Data

[63] Continuation-in-part of Ser. No. 714,395, Aug. 16, 1976.

[51] Int. Cl.² .................. A62B 35/00; B65H 75/48
[52] U.S. Cl. ........................... 242/107; 242/107.4 R
[58] Field of Search ........................... 242/107-107.7; 297/388; 280/744-747; 185/37, 39

[56] References Cited

U.S. PATENT DOCUMENTS

| | | | |
|---|---|---|---|
| 3,880,364 | 4/1975 | Andres | 242/107.4 R |
| 3,957,222 | 5/1976 | Bladh | 242/107 |
| 3,957,283 | 5/1976 | Pocobello | 242/107.4 R |
| 3,984,063 | 10/1976 | Knieriemen | 242/107 |
| 4,002,219 | 1/1977 | Steinmann | 242/107 X |
| 4,026,494 | 5/1977 | Tanaka | 242/107 |

Primary Examiner—Harvey C. Hornsby
Assistant Examiner—John M. Jillions
Attorney, Agent, or Firm—Poms, Smith, Lande & Glenny

[57] ABSTRACT

A safety belt retractor has a belt storage spool and a spool rewind spring for biasing the spool in a belt rewind direction, means for reducing the tension applied to the belt when in use due to the bias of the rewind spring, means for activating such means for reducing in response to spool rotation in a predetermined manner and means for deactivating such means for reducing in response to spool rotation in a belt rewind direction of more than one full revolution of the spool under the influence of said reduced tension. The means for reducing the resultant effect of the rewind bias of the spring in an exemplary embodiment includes means for selectively applying a portion of the rewind torque of the spool rewind spring back on to the spool through a gearing arrangement in one version, and through a pulley means in another arrangement, in a belt unwinding direction to produce a reduced torque or "comfort zone" effect upon the spool.

16 Claims, 17 Drawing Figures

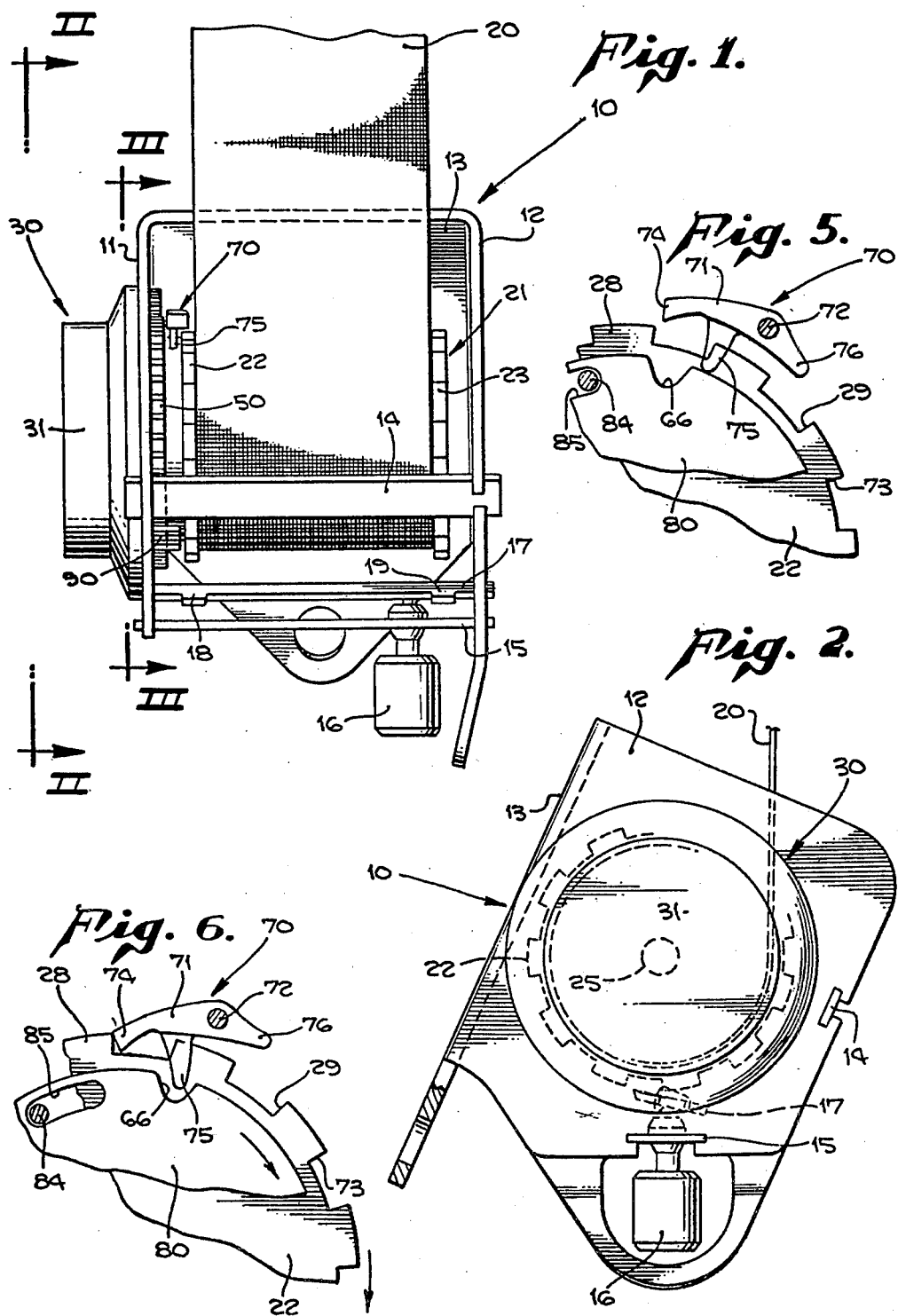

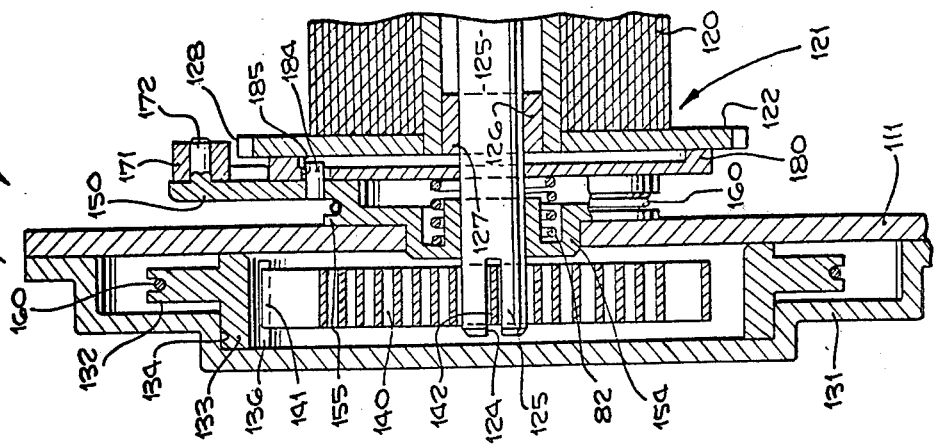
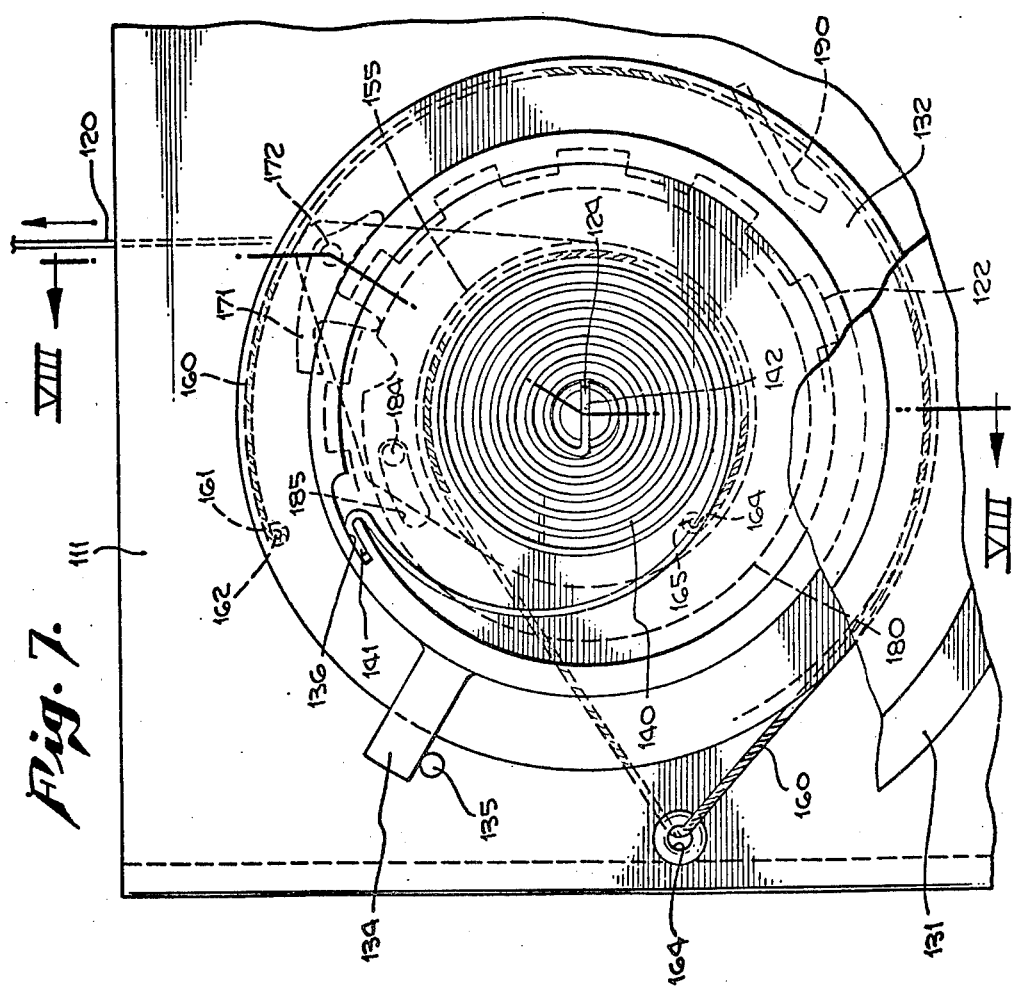

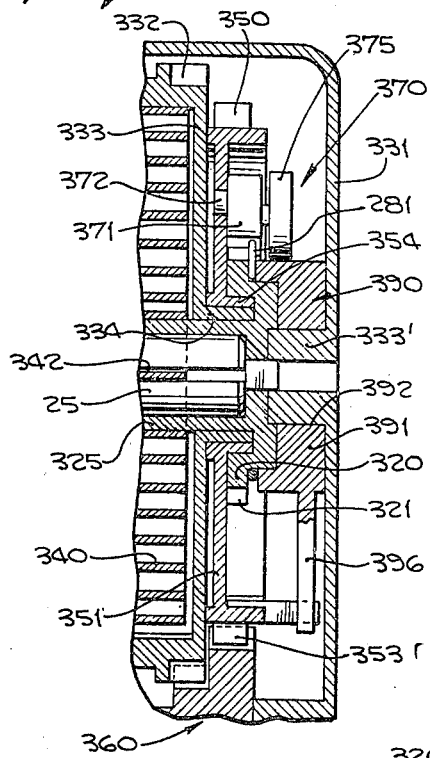
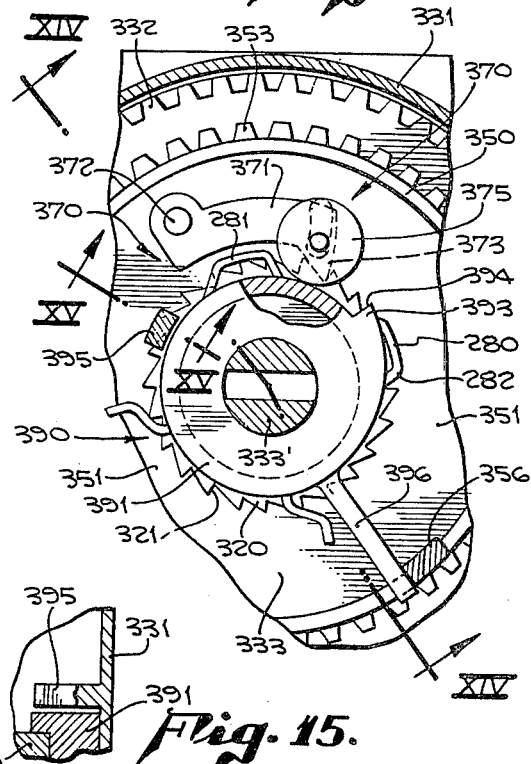
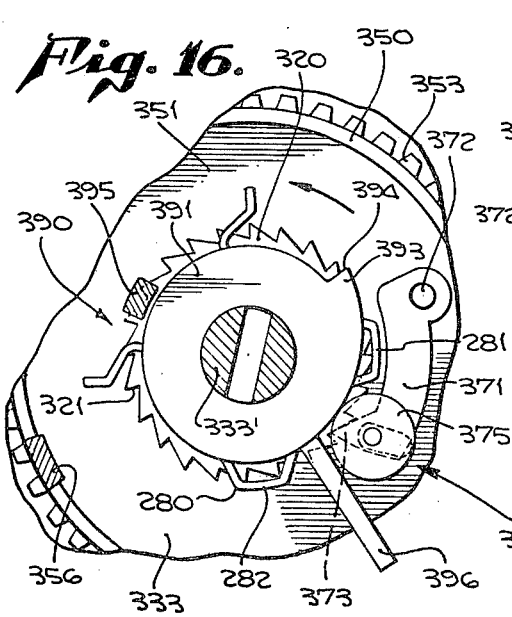
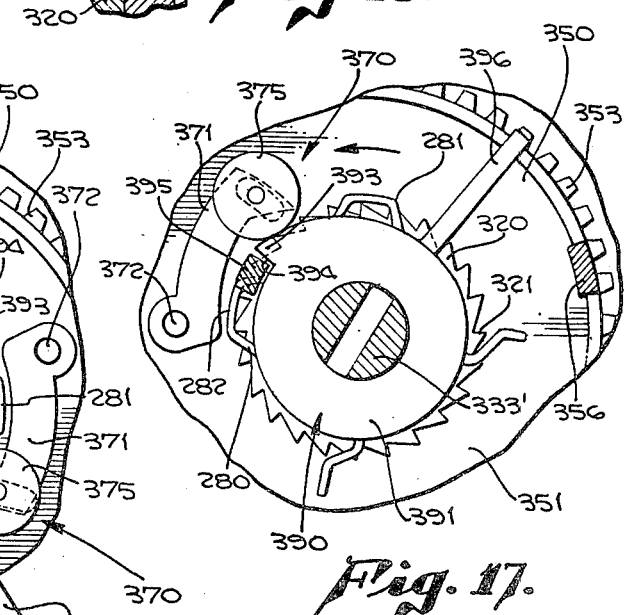

EMERGENCY LOCKING RETRACTOR WITH COMFORT BELT TENSION

RELATED APPLICATIONS

This application is a continuation-in-part of my co-pending application Ser. No. 714,395 filed Aug. 16, 1976.

BACKGROUND OF THE INVENTION

This invention relates in general to emergency locking safety belt retractors for vehicles wherein the safety belt allows freedom of movement of the passenger under the tension of the retractor rewind spring subject to locking up in the event of an emergency condition, and more specifically to means for reducing the tension applied to the belt when in use due to the retraction spring bias upon the belt.

Various types of safety belt harnesses employing various safety belts and straps are currently in use in automotive and air vehicles for restraining passengers in their seats in the event of an emergency condition. It is common practice to employ safety belt retractor devices in association with such harnesses and belt systems in order to store the belt or webbing when it is not in use. Because of the rewind spring employed to rewind the belt into the retractor, there is a certain tension applied by the rewind spring to the belt when it is placed about the passenger in use. It has been recognized heretofore that such tension can be objectionable to the vehicle passenger and various means have been employed heretofore for relieving or reducing the tension of the rewind spring on the belt when in use. One such prior attempt is disclosed in the prior U.S. Pat. No. 3,834,646 in which belt tension is completely relieved by means activated by a belt manipulation to hold the belt storage reel against retraction. However, it has been found to be desirable to have a low tension bias on the belt toward a rewind condition in order to avoid a slack belt condition and to facilitate employing means for automatically retracting the belt if it is merely disconnected when in the so-called "comfort zone" condition when the reduced tension is in affect.

In my prior co-pending U.S. patent application Ser. No. 635,413, filed Nov. 26, 1975, I have disclosed tension relieving means for safety belt retractors wherein additional means are provided for applying a low tension upon the safety belt when the bias of the main rewind spring is blocked from acting upon the belt. In my co-pending application Ser. No. 714,395 filed Aug. 16, 1976, I have disclosed a tension relieving means which employ a single spring for biasing the reel in both main rewind and low tension rewinding modes, with means for selectively applying a portion of the rewind torque of the safety belt retractor rewind spring back on to the retractor spool in a belt unwinding direction to produce a reduced torque "comfort zone" condition for the belt when it is placed in use and manipulated in a predetermined manner, more specifically in response to a slight retraction movement of the belt following an initial protraction thereof. In each of these prior retractors having a "comfort zone" effect, the extent of belt movement while under the effect of the reduced tension has been somewhat limited.

SUMMARY OF THE INVENTION

It is the primary object of the present invention to disclose and provide an improvement in means for providing a low tension or "comfort zone" effect on a seat belt when in use which allows for an extended amount of seat belt travel while in the "comfort zone" mode than heretofore available in prior art "comfort zone" producing retractors as described hereinbefore.

It is a further object of the present invention to disclose and provide improvements in means for deactivating the means provided for producing a reduced torque effect of the retractor spool rewind spring which will provide for a spool rotation of more than one complete revolution of the spool while in a "comfort zone" mode in a belt rewind direction before the full torque of the spool rewind spring is reapplied.

Generally stated, the present invention comprises the provision of means for providing a reduced or low tension "comfort zone" mode of movement of the seat belt and specifically means for deactivating such low tension producing means in response to spool rotation in a belt rewind direction of more than one full revolution of the spool under the influence of the reduced tension.

Generally stated, the exemplary embodiment of safety belt retractor of my co-pending application Ser. No. 714,395 contemplated a safety belt retractor having a belt storage spool and a spool rewind spring connected at one end to the spool to bias the spool in a rewind direction is provided with means for selectively connecting the opposite end of the rewind spring to the spool to provide an opposite biasing effect on the spool to that applied by the first end acting on the spool. The means for selectively connecting the spring opposite end to the spool is provided so as to give a mechanical advantage to the spool, and thus the biasing of the first end of the spring, whereby the net effect on the spool is a reduced rewind bias and a reduced or "comfort zone" effect on the safety belt mounted to the retractor. In one exemplary embodiment of the present invention, gearing means are provided for interconnecting the opposite end of the spring to the spool while in a second exemplary embodiment pulley means are employed for interconnecting the spring opposite end and the spool for producing the back torque effect.

As particularly contemplated within the present invention, an exemplary embodiment of the present invention in means for deactivating the means for producing a reduced tension via the exemplary back torque effect of my prior application includes the provision of cam means interposed between gear members of the gearing means which rotate at different speeds during spool rotation whereby more than one spool rotation is required to rotate the cam means into a position to deactivate the interconnecting means between the spool and spring opposite end which produces the back torque effect. The back torque effect may thus be deactivated in response to spool rotation of over one or more full turns of the spool due to the gearing arrangement to provide the extended comfort zone effect.

In another exemplary embodiment, the camming means for deactivating the tension reducing means is rotatably mounted on the inside of the cover for the tension reducing means and associated therewith to allow more than one full spool rotation before the camming means moves to a position deactivating the tension reducing means as the spool rotates in a belt rewind direction under the influence of the lower tension when in the "comfort zone" mode.

A more complete understanding of the present invention, as well as how it achieves the aforestated objects and advantages thereof, will become apparent to those skilled in the art from a consideration of the following detailed description of three exemplary embodiments of the present invention. Reference will be made to the appended sheets of drawings which will be first briefly described.

BRIEF DESCRIPTION OF THE DRAWINGS

FIG. 1 is an elevational view of an exemplary embodiment of emergency locking safety belt retractor in which a first exemplary embodiment of the present improvement in means for reducing the tension applied to the safety belt when in use, in accordance with the present invention, is illustrated;

FIG. 2 is a side view of the retractor of FIG. 1 taken therein along the plane II—II;

FIG. 5 is a detail view taken in FIG. 4 along the plane V—V;

FIG. 6 is a detail view as in FIG. 5 showing pawl means engaging ratchet means to place the exemplary embodiment of means for reducing the tension applied to the belt when in use in operating condition;

FIG. 7 is a side view of a second exemplary embodiment of means for reducing the tension applied to the belt when in use, according to the present invention, which may be incorporated in the retractor of FIG. 1;

FIG. 8 is a section view of the exemplary embodiment of FIG. 7 taken therein along the plane VIII—VIII;

FIG. 13 is a side view of a fourth exemplary embodiment of means for reducing the tension applied to the belt when in use, which may be incorporated as an alternative to the embodiment of FIGS. 9–12;

FIG. 14 is a section view of the exemplary embodiment of FIG. 13 taken therein along the plane XIV—XIV;

FIG. 15 is a detail view taken in FIG. 13 along the plane XV—XV;

FIG. 16 is a view as in FIG. 13 showing the "comfort zone" condition; and

FIG. 17 is a view as in FIG. 16 showing a deactivation of the "comfort zone" effect.

DETAILED DESCRIPTION OF THE PREFERRED EXEMPLARY EMBODIMENT

Figure 4:
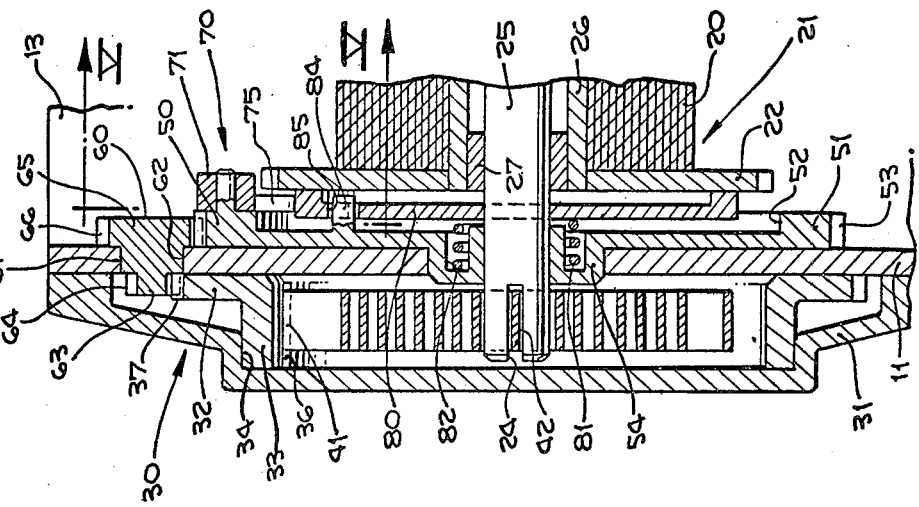
FIG. 4 is a section view of the retractor of FIG. 3 taken therein along the plane IV—IV.

An exemplary embodiment of emergency locking type safety belt retractor illustrated in FIG. 1 generally at 10, and as is conventional, includes a generally U-shaped frame comprising side walls 11 and 12 formed integrally with base 13. Spacer bars 14 and 15 provide structural rigidity to the frame with bar 15 also serving to pivotally mount an inertia responsive pendulum 16 which is provided in known manner to actuate a lock bar 17 having teeth 18 and 19. A safety belt 20 is wound upon a conventional spool, indicated generally at 21, having ratchet wheels 22 and 23 fixed thereto. The retractor frame may be mounted to a vehicle frame in conventional manner to place the associated safety belt 20 in position to be drawn from the retractor and placed in use about the passenger when associated with conventional buckling means provided in the vehicle. An exemplary retractor in which the present improvement in means for reducing the tension applied to the belt when in use may be employed is disclosed in the co-pending application for U.S. Letters Patent Ser. No. 627,875 filed Oct. 31, 1975 and owned by the assignee of the within application. The disclosure of retractor mechanism of said United States application is incorporated herein by this reference.

As is apparent to those skilled in the art, the retractor illustrated generally at 10 in FIGS. 1 and 2, will lock up, preventing further belt unwinding or protraction, in an emergency condition when pendulum 16 swings under changing inertia conditions and causes lock bar 17 to engage with the teeth of the ratchet wheels 22 and 23. Thus far, the retractor mechanism described is conventional. However, as contemplated within the present invention, an improved means is disclosed herein for reducing the tension applied to belt 20 when the belt is placed in use.

Figure 3:
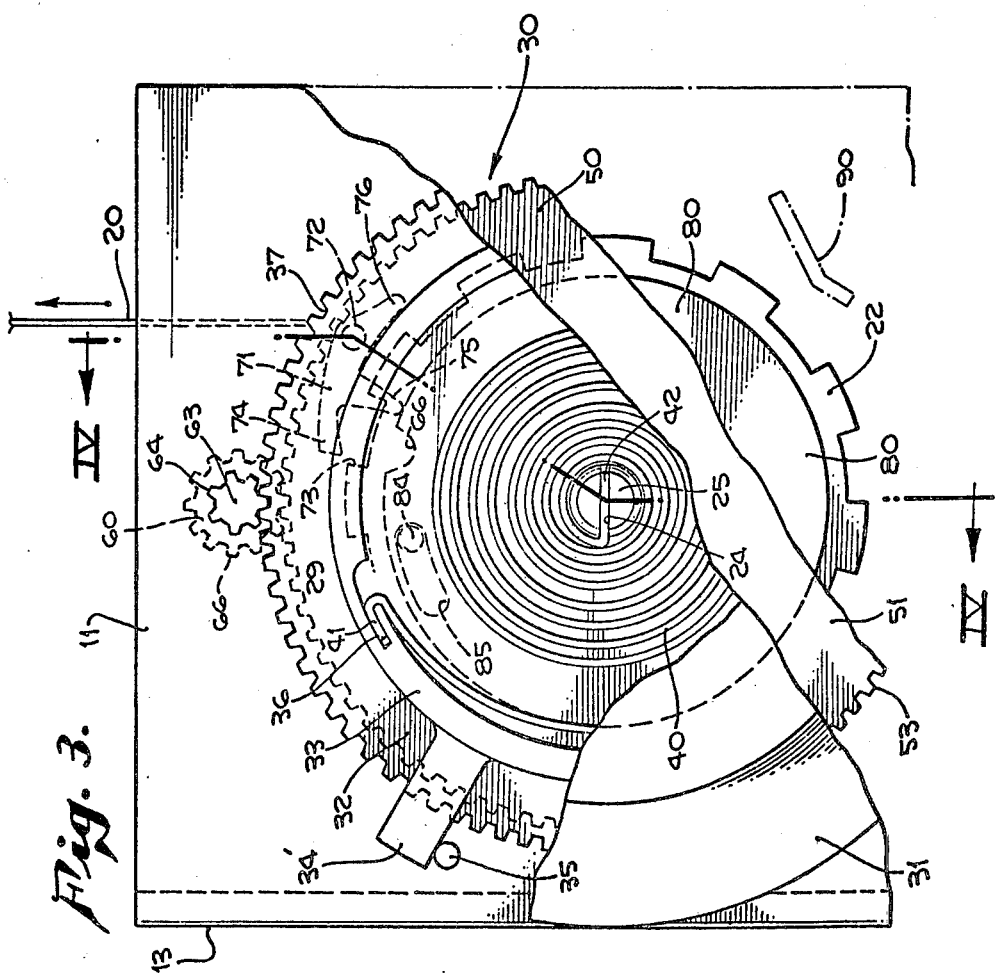
FIG. 3 is a section view through the retractor of FIG. 1 taken therein along the plane III—III.

Referring now to FIGS. 1, 3 and 4, the preferred exemplary embodiment in means for reducing the tension applied to the belt when in use comprises means for selectively applying a portion of the rewind torque normally applied by the rewind spring to the spool in a belt unwinding direction to produce a net reduced torque effect upon the spool. Such means are illustrated generally at 30 in the preferred exemplary embodiment within the housing 31 secured by appropriate fastening means to side wall 11 of the retractor. Such means, in the first exemplary embodiment, initially comprise the provision of a ring gear 32 having a cylindrical portion 33 fitted within cylindrical recess 34 of housing 31 to rotatably mount ring gear 32 within housing 31 against side wall 11. The counter clockwise rotation of ring gear 32, as viewed in FIG. 3, is limited by the provision of a first stop portion 34' on ring gear 32 which is adapted to abut a stop pin 35 mounted to the retractor side wall 11. The outer end 41 of coil spring 40 is fitted within slot 36 of the ring gear to interconnect the outer free end of spring 40 with the ring gear. Spring free end 41 is held against clockwise rotation when ring gear 32 has rotated fully counter clockwise in FIG. 3 against stop pin 35 as seen in FIG. 3. An inner end 42 of spring 40 is fitted within end slot 24 of spool shaft 25 as seen in FIGS. 3 and 4 to normally bias shaft 25 in a belt rewind direction.

As seen in FIG. 4, the safety belt spool, indicated generally at 21, comprises a tubular spool base 26 to which the ratchet wheels 22 and 23 are fixed and is in turn non-rotatably fixed to shaft 25 by conventional spacer means as bushing 27 shown press fit between shaft 25 and spool base 26 in FIG. 4. From the foregoing, it can be seen that spring 40 will normally bias spool shaft 25 in a clockwise direction in FIG. 3 attempting to wind belt 20 back on to the retractor spool whenever the belt is protracted to a position of use.

Back torque applying means are provided for selectively applying a portion of the rewind torque of spring 40 back on to the spool indicated generally at 21, in a belt unwinding direction to produce a reduced torque effect upon the spool. In the preferred exemplary embodiment, such means includes the aforedescribed ring gear 32, a second gear 50, and interconnecting reducing gear 60 and means indicated generally at 70 for selectively connecting gear 50 to the spool as hereinafter explained. As best seen in FIG. 4, second gear 50 is of generally disc configuration and includes a disc body 51 having an internal recess 52 and external gear teeth 53. A central hub 54 rotatably mounts gear 50 on shaft 25 to be freely rotatable thereabout.

Reducing gear means 60 are interposed between ring gear 32 and gear 50 as seen in FIGS. 3 and 4 in the exemplary embodiment. Gear 60 is rotatably mounted by a central portion 61 within an aperture 62 formed in side wall 11 and is of stepped configuration in providing a smaller gear portion 63 having external teeth 64 meshing with teeth 37 of gear 32 exteriorly of wall 72 and a larger diameter gear means 65 having teeth 66 meshing with teeth 53 of gear 50 internally of wall 11. As described hereinafter, gear 50 is given a mechanical advantage over gear 32 by the arrangement of interconnecting gear 60 thus described.

Means are provided for selectively interconnecting gear 50 with the spool indicated generally at 21. In the exemplary embodiment, such means, indicated generally at 70, comprise the provision of pawl 71 mounted by pivot pin 72 to gear 50 which functions in the present embodiment also as a pawl carrier for carrying pawl 71 for rotation about shaft 25 as discussed hereinafter. Pawl 71 is adapted to engage teeth of the ratchet wheel 22 to interconnect gear 50 with the spool as seen in FIG. 6. In the preferred embodiment, square teeth 28 are preferably provided on ratchet wheel 22 so that a first side 29 may be engaged by lock bar 17 as aforedescribed while a second side 73 may be engaged by the pawl tooth 74, as seen in FIG. 6, to interconnect gear 50 and spool ratchet wheel 22. As seen from the foregoing, when pawl 71 engages a tooth of spool ratchet wheel 22, the outer end of spring 40 is interconnected through gears 32, 60 and 50 to the spool applying a back torque of the biasing spring 40 upon the spool in a direction promoting a belt unwinding movement of the spool counteracting the belt winding action of the inner end of spring 40 on shaft 25. By virtue of the provision of a mechanical advantage to gear 50 over gear 32, a reduced tension affect can be achieved for belt tension when the belt is placed in use and pawl means 71 is interconnected with spool ratchet wheel 22. The precise arrangement of gearing for producing a desired reduced torque affect on the webbing can be computed as follows:

Assuming:
$TM$ = Main Spring 40 torque
$TP$ = Pawl Carrier 50 back torque
$TW$ = Belt 20 torque
and for equilibrium when pawl 71 is engaged with ratchet wheel 22 that:

$$TM = TP + TW$$

Then:

$$TP = (TM/R)$$

$$\therefore TW = TM(1 - 1/R)$$

or $$(TW/TM) = 1 - (1/R)$$

where
$R = (N4/N3) \times (N2/N1)$ and
$N1$ is the number of teeth 53 for gear 50; $N2$ is the number of teeth 66 of gear means 65; $N3$ is the number of teeth 64 of gear means 63; and $N4$ is the number of teeth 37 of gear 32.

It may be seen to those skilled in the art from the foregoing, that the desired belt torque or level or reduced tension can be computed via the foregoing computations to determine the number of teeth required for gears 32, 60 and 50 to obtain a desired reduced torque or reduced tension affect for the belt 20 where a known torque of the rewind spring is provided.

Means are provided for maintaining pawl 71 out of engagement with ratchet wheel teeth 28 during unwinding of belt 20 which allows engagement of pawl 71 with teeth 28 upon a slight retraction movement of belt 20 after it has been placed in use. Such means in the exemplary embodiment comprise the provision of cam means including cam disc 80 which is rotatably mounted about shaft 25 and biased by spring 81 against spool ratchet wheel 22 as seen in FIG. 4. Spring 81 is fitted within a recess 82 in gear 50 and presses against disc 80 to force its annular peripheral surface 83 in a frictional drive relation with wheel 22. Rotation of disc 80 relative to pawl carrier gear 50 is limited by the provision of pin 84 on gear 50 which fits within slot 85 in disc 80 as seen in FIGS. 3 and 4. On an unwinding movement of belt 20, spool ratchet wheel 22 rotates counter clockwise in FIG. 3 causing cam disc 80 to rotate counter clockwise within the limits allowed by pin 84. In this position, cam 80 underlies cam follower portion 75 of pawl 71 to hold pawl tooth 74 out of engagement with teeth 28 of ratchet wheel 22. When belt 20 has been protracted (unwound) to a position of use, there is normally a slight retraction (rewinding) movement following buckling up of the safety belt. This slight retraction movement of belt 20 causes a clockwise rotation of spool ratchet wheel 22 and frictionally driven disc 80, within the limits allowed by pin 84 as seen in FIG. 6, to bring cam recess 66 beneath pawl follower 75 and thus allow pawl lock up with the ratchet wheel teeth 28.

When the retractor is in the reduced belt tension or "comfort zone" effect provided by the back torquing of spring power of spring 40 on to the spool when pawl 71 engages ratchet wheel 22 as aforedescribed, the net reduced tension effect biases the spool in a belt winding direction and causes gear 32 and gear 50 to rotate clockwise in FIG. 3 providing a low tension winding movement of belt 20 avoiding any slack belt condition for a predetermined length of belt travel, according to the present invention, determined by means for releasing pawl 71 automatically when a predetermined comfort zone rewind has occurred. In the exemplary embodiment, such means for deactivating pawl 71 comprise the provision of a cam ramp 90 provided on retractor side wall 11 at an arcuate distance from the position of pawl 71 when it initially engages with the ratchet teeth 28 as seen in FIG. 3. When the rear end 76 of pawl 71 engages ramp 90, it is pivoted about its pivot pin 72 to release spool ratchet 22, disconnect the gearing means from the spool and allow for a return of the gearing means to the position of FIG. 3 and a rewind of belt 20 under the full tension of spring 40.

Second Exemplary Embodiment

Referring now to FIGS. 7 and 8, an alternative exemplary embodiment is illustrated in which pulley means are provided in place of the aforedescribed gear means for applying a back torque upon the spool to effect a reduced tension in the safety belt when placed in use. This alternative exemplary embodiment is illustrated in use with the exemplary emergency retractor of FIG. 1 wherein belt 120 is mounted on a spool, indicated generally at 121 and including ratchet wheels, as ratchet wheel 122 spool shaft 125, spool base 126 and spacer 127 as aforedescribed operating in association with the retractor frame including side wall 111. In this embodiment, spring 140 has its outer free end 141 fitted within a slot 136 of a first pulley means 132. Pulley means 132 is mounted as gear 32 by a cylindrical ring portion 133 fitted within cylindrical recess 134 in housing 131. Inner end 142 of spring 40 is fitted within end slot 124 of shaft 125. Counter clockwise rotation of pulley means 132 in FIG. 7 is limited by stop 134 which is adapted to abut stop pin 135 mounted to side wall 111. Spring 40 thus biases the belt spool in a belt winding direction, clockwise in FIG. 7, as in the prior embodiment.

A second pulley means 150 is provided interiorly of wall 111 and is rotatably mounted by hub 154 on shaft 125. Pulley 150 mounts pawl 171, via pivot pin 172, for a selective engagement with teeth 128 of ratchet wheel 122 under the control of friction disc 180 as in the aforedescribed embodiment. Disc 180 is biased by spring 82 and is provided with a limit slot 185 engaging pin 184 as in the prior embodiment.

Belt means, comprising rope 160, are provided for interconnecting pulley means 132 with pulley means 150. As seen in FIG. 7, one end 161 of pulley rope 160 is secured by a pin 162 to the large diameter pulley 132 and extends thereabout and through aperture guide 163 through wall 111 to wind about and be secured at its opposite end 164 by pin 165 to the smaller working diameter of portion 155 of pulley 150. When pawl 171 engages the spool ratchet wheel 122 in this embodiment under belt manipulation as described in the prior embodiment, the spring torque 140 will be acting against itself on spool 121 through pulley means 132 and 150 and their interconnecting pulley rope 160 to produce a net effect of a reduced tension upon belt 120 to be felt by the passenger utilizing the safety belt. On a rewind motion of the spool in this "comfort zone" affect of a predetermined amount, as in the prior embodiment, pawl 171 will be released by ramp 190 and the full torque of spring 140 will be reapplied to spool 121 without the back torquing effect described hereinbefore.

Third Examplary Embodiment

Referring now to FIGS. 9 through 12, a further alternative exemplary embodiment is illustrated in which the "comfort zone" effect is extended up to two revolutions of the spool which can accommodate up to 8-12 inch belt movement under the reduced tension applied during the "comfort zone" condition. This exemplary embodiment is illustrated in association with the exemplary retractor of FIG. 1 with like parts being indicated by like reference numerals in FIGS. 9 and 10.

In the present embodiment, ring gear 232 is formed in a cup 233 which is journaled by its hub 234 fitted about sleeve 225 for rotation relative to spool shaft 25. The outer end 241 of coil spring 240 is fitted within slot 236 of the ring gear to interconnect the outer free end of spring 240 with the ring gear in the manner of the first embodiment. An inner end 242 of spring 240 is fitted within end slot 24 of spool shaft 25 to normally bias shaft 25 in a belt rewind direction.

Figure 9:
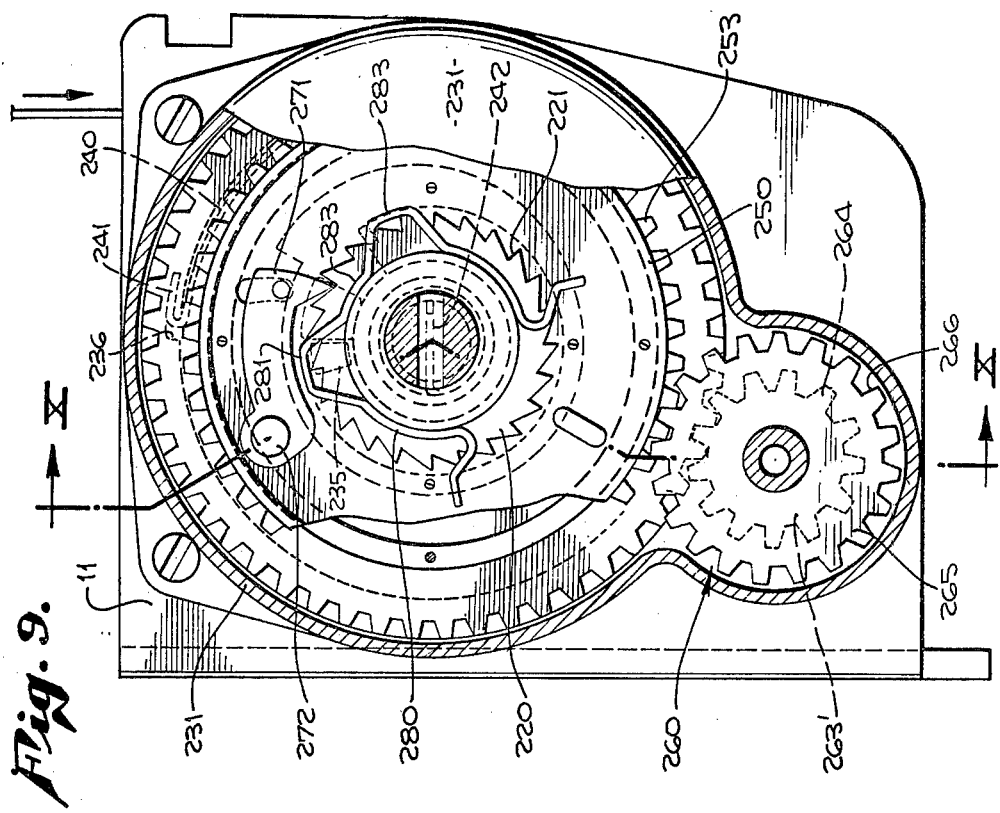
FIG. 9 is a side view of a third exemplary embodiment of means for reducing the tension applied to the belt when in use, according to the present invention, which may be incorporated in the retractor of FIG. 1.
Figure 10:
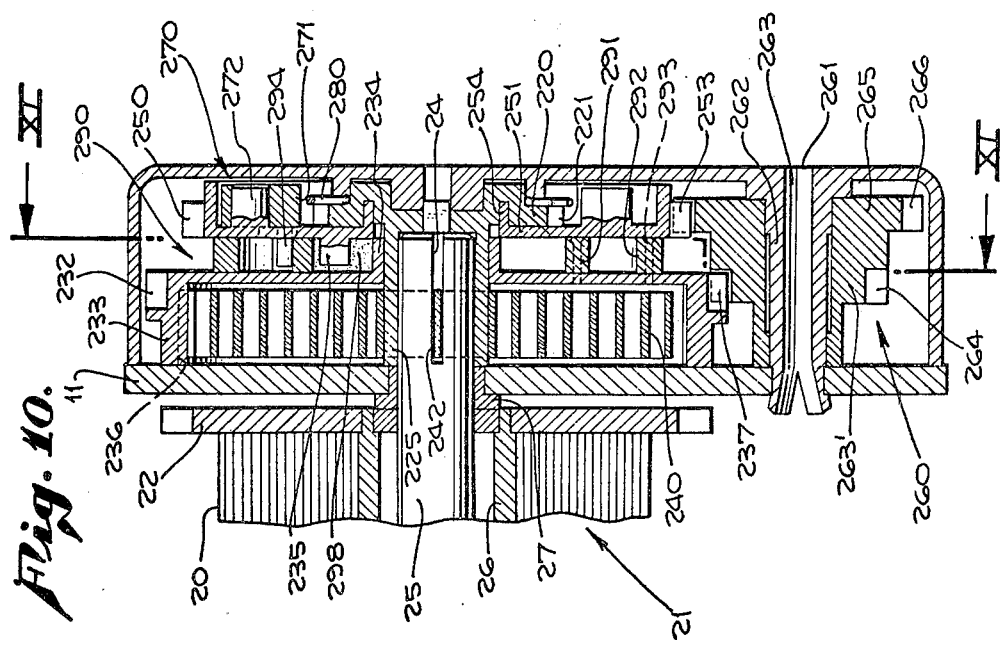
FIG. 10 is a section view of the exemplary embodiment of FIG. 9 taken therein along the plane X—X.

The means for applying a back torque on the spool, in this embodiment, includes the aforedescribed ring gear 232, a second gear 250 and interconnecting reducing gear means, indicated generally at 260, in the manner of the first embodiment, and means indicated generally at 270 for selectively connecting gear 250 to the spool. As best seen in FIGS. 9 and 10, gear 250 is of generally cylindrical configuration and includes a body 251 formed integrally of sleeve 254 and mounted thereby for rotation relative to shaft 25. External gear teeth 253 are formed around the periphery of gear 250 as seen in FIG. 9.

The reducing gear means, indicated generally at 260, are interposed between ring gear 232 and gear 250, and as best seen in FIG. 10, are rotatably mounted by a central portion 261 fitted about journal portion 262 formed integrally of the cover and in turn fitted about shaft 263. The reducing gear may be made of plastic and be so provided in association with the gears 232 and 250 so as to return 50 to 65 percent of the reaction torque from the outside of the spring back to oppose the full torque applied to the spool shaft from the center coils of the spring, thus producing a net torque of 35 to 50 percent being used to provide the low tension effect. As seen in FIG. 10, the steps configuration of the reducing gear provides a smaller gear portion 263' having external teeth 264 meshing with teeth 237 of gear 232 and a larger diameter gear portion 265 having teeth 266 meshing with teeth 253 of gear 250.

As in the first embodiment, means are provided for selectively interconnecting gear 250 with the spool indicated generally at 21. In this embodiment, such means, indicated generally at 270, comprises the provision of pawl 271 mounted by pivot pin 272 to gear 250 which functions in this embodiment also as a pawl carrier for carrying pawl 271 for rotation about shaft 25 as discussed hereinafter. Pawl 271 is adapted to engage teeth 221 of the ratchet wheel 220 formed integrally of sleeve 225 fixed non-rotatably to shaft 25. When pawl 271 engages a tooth of ratchet wheel 220, the outer end of spring 240 is interconnected through gears 232, 260 and 250 to the spool applying a back torque of the biasing spring 240 upon the spool in a direction promoting a belt unwinding movement of the spool counteracting the belt winding action of the inner end of spring 240 on shaft 25. However, by virtue of the provision of a mechanical advantage to gear 250 over gear 232, as aforedescribed, a reduced tension effect can be achieved for belt tension when the belt is placed in use and pawl means 271 is interconnected with ratchet wheel 220.

Cam means, including spring wire cam 280, are provided in the exemplary emnbodiment in a groove formed between ratchet wheel 220 and cover 231 for rotation via a friction drive off of the ratchet wheel relative to the pawl 271. During normal protraction and retraction of the safety belt relative to the spool, cam lobes 281 and 282, respectively, will underlie pawl 271 holding it out of engagement with the ratchet wheel 220. However, on a slight retractive movement of the safety belt, following its protraction to a position of use, the cam recess 283 portion of the spring cam 280 will underlie pawl 271 allowing it to engage with the ratchet wheel 220 as seen in FIG. 9. A "comfort zone" condition for the seat belt is thus effected as aforedescribed.

As particularly contemplated within the invention of the present exemplary embodiment, the means for deactivating pawl 271 have the capability of providing a greater length of "comfort zone" condition of up to a belt movement equivalent to two revolutions of the spool. Essentially, in the present embodiment, the cam for disengaging pawl 271, as opposed to the stationary mounting in the prior embodiments, is mounted on the cup 233 formed integrally of ring gear 232. Since ring gear 232 rotates in the same direction as the pawl carrier gear 250, but a different speed due to the gearing of interconnecting gears 260, it is possible to obtain up to two spool revolutions in the low tension condition for the retractor, which is equivalent to approximately 8 to 12 inches of belt travel.

Figure 12:
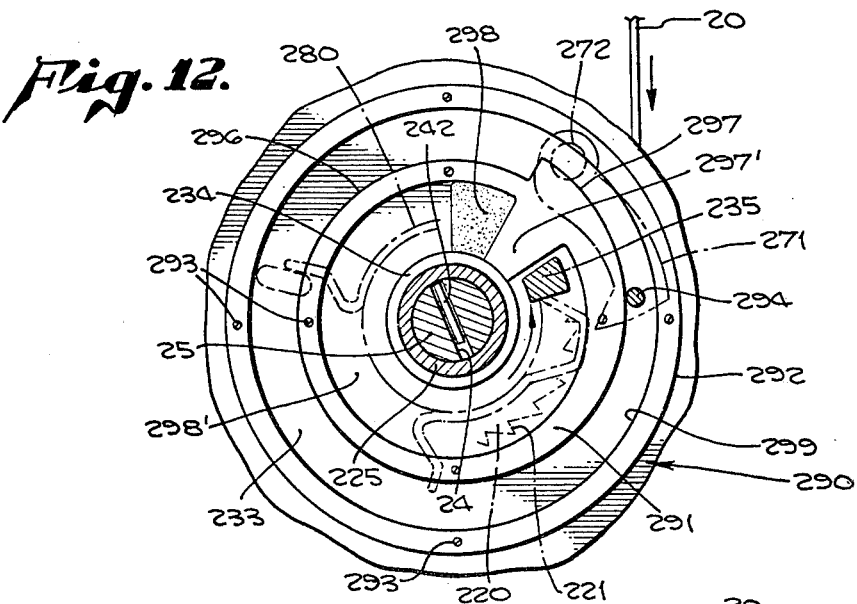
FIG. 12 is a detail view of the embodiment of FIG. 11 showing the end of a "comfort zone" effect.
Figure 11:
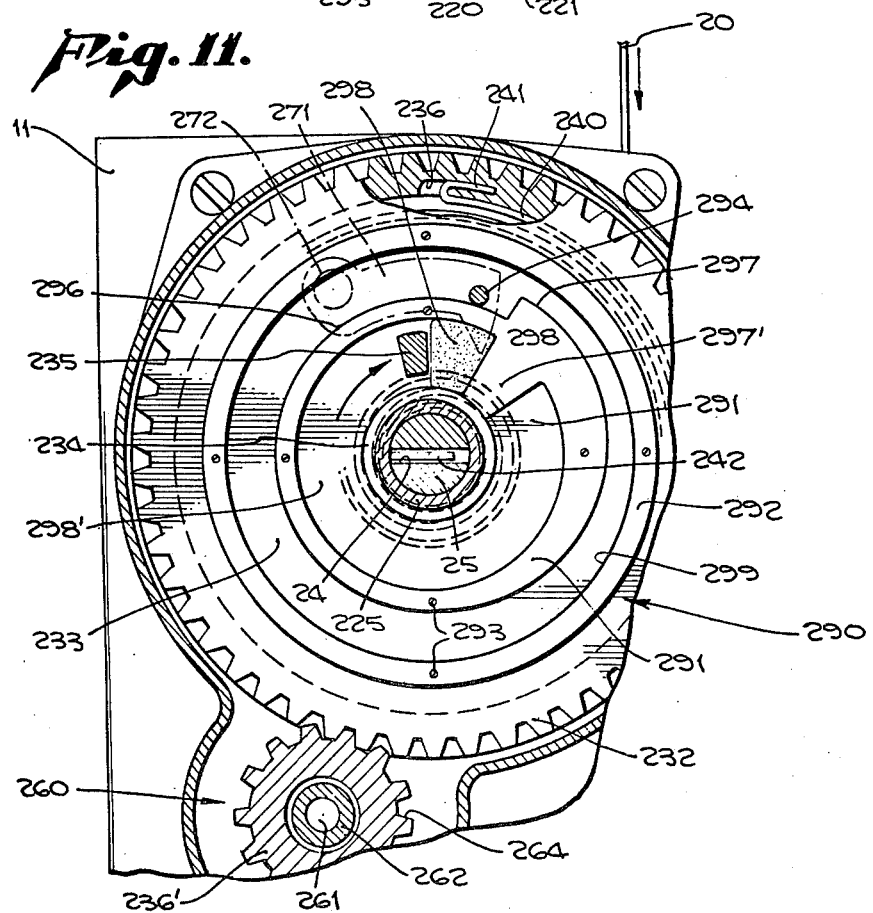
FIG. 11 is a section view of the exemplary embodiment of FIG. 10 taken therein along the plane XI—XI showing the initiation of a "comfort zone" effect.

Pawl release cam means, in the present exemplary embodiment, indicated generally at 290, and as best seen in FIGS. 10 and 11, comprise an inner cam ring 291 and an outer cam ring 292 secured by appropriate fasteners, as set screws 293 to a side wall of cup 233. A cam follower pin 294 is mounted to pawl 271 and extends through slot 295 in gear body 251 to ride on the cam surface 296 of cam ring 291. As best seen in FIG. 11, cam ring 291 is provided with a configuration such that the surface of cam portion 297 will cause cam follower pin 294 to lift pawl 271 out of engagement with ratchet 220 when relative rotation between gears 232 and 250 cause pin 294 to reach such portion 297 as seen in FIG. 12 during an extended comfort zone belt retraction movement.

Inner cam ring 291, as best seen in FIG. 11, has a radially inwardly extending segment 297' adjacent to which a stop 298 is provided. Stop 298 may be formed of a resilient, rubber-like material to provide a bumper stop for abutment 235 formed integrally of body 251 of ring gear 250. Abutment 235 fits within annular space 298' formed within inner cam ring 291 adjacent the side wall of cup 233 and limits the relative rotation between gears 232 and 250.

By virtue of the provision of abutment 235 and bumper stop 298 aforedescribed, relative rotation between gears 232 and 250 is limited to that encountered during a retraction movement of the belt in the comfort zone condition. During normal protraction of the belt, ring gear 232 is held against rotation under the bias of the outer end 241 of rewind spring 240 since the reducing gear interconnection between gears 232 and 250 via gear 260 prevents concurrent rotation in a clockwise direction in FIG. 9. However, when the safety belt has been placed in use and is slightly retracted, and pawl 271 engages ratchet 220, a belt retraction movement in the "comfort zone" condition causes concurrent counterclockwise rotation of gears 232 and 250 in FIGS. 9, 11 and 12, but at different rates of speed due to the gearing interconnection. Thus, for the gear ratios indicated hereinbefore, as spool shaft 25 and gear 250, to which abutment 235 is secured, make two revolutions in the counterclockwise direction from the positions of FIG. 11 to that of FIG. 12, the spring cup 233 and integral gear 232, including cam ring 291 will have followed in the same direction and made one revolution, the difference in revolutions accounting for the displacement of abutment 235 from the left side of bumper stop 298 in FIG. 11 to the right side of segment 297 as seen in FIG. 12. At this point, pawl 271 is disengaged by cam surface 297 from ratchet wheel 220, and pawl 270 is held out of engagement thereafter by cam spring lobe 287 during a full rewind action during which gears 232 and 250 will have returned to their initial relative disposition as seen in FIG. 11. Outer ring 292 provides an inner surface 299 preventing over travel of pawl 271 via its interengagement with pin 294.

Fourth Exemplary Embodiment

Referring now to FIGS. 13 through 17, a further alternative exemplary embodiment of the within invention in extended comfort zone means is illustrated which can accommodate safety belt travel while in the "comfort zone" mode comparable to more than one spool rotation. This exemplary embodiment is illustrated in association with the exemplary retractor of FIG. 1 and specifically in association with the retractor construction explained hereinbefore with regard to the third exemplary embodiment. However, it should be understood by those skilled in the art that the within extended "comfort zone" means may be employed with other retractor constructions such as that disclosed in copending application Ser. No. 751,753 filed Dec. 17, 1976 and assigned to the Assignee of the within application.

Referring initially to FIG. 14, and as in the prior embodiment, a first member, as ring gear 332 formed in the shape of a cup 333, is rotatably mounted relative to the retractor frame as by cup hub 334 fitted about the sleeve 325. As before, the outer end of coil spring 340 is connected to the first member, ring gear 332. An inner end 342 of spring 340 is connected to shaft 25 to normally bias shaft 25, and its associated spool, in a belt rewind direction.

The means for providing a reduced tension on the spool, and thus the belt, in this exemplary embodiment, as in the prior, includes the provision of means for applying a back torque on the spool rewind spring 340. A second member, gear 350, is interconnected by torque reducing means, as step gear means indicated generally at 360, in the manner of the prior embodiment. The second member, gear 360, is interconnectable to the spool via the connecting means indicated generally at 370. As best seen in FIGS. 13 and 14, gear 350 is formed integrally of a body 351 which in turn is formed integrally of sleeve 354 and is mounted thereby for rotation relative to shaft 25. External gear teeth 353 are formed around the periphery of gear 350 as seen in FIG. 13. The first and second members, gears 332 and 350, are thus interconnected as in the prior embodiment.

As in the prior embodiment, means are provided for selectively interconnecting the second member, gear 350, with the spool to place the mechanism in a "comfort zone" mode. In the present embodiment, such means, indicated generally at 370, include the provision of pawl 371 mounted by pin 372 to the member 350 which functions as a pawl carrier for carrying pawl 371 in a rotative manner about spool shaft 25 as discussed before. Pawl 371 is adapted to engage teeth 321 of the ratchet wheel 320 formed integrally of sleeve 325 which is fixed non-rotatably to shaft 25. When pawl 371 engages a tooth of ratchet wheel 320, the outer end of spring 340 is interconnected through gears 332, 360 and 350 to the spool applying a back torque of the biasing spring 340 upon the spool in a direction promoting a belt unwinding movement of the spool counteracting the belt winding action of the inner end of spring 340 on shaft 25. However, by virtue of the provision of a mechanical advantage to gear 350 over gear 332, as described in the prior embodiment, a reduced tension effect is achieved with the gears 350 and 332 rotating in a common direction during spool rewind in the "comfort zone" mode but at different speeds as described before. In the present embodiment, a still further potential extension of the "comfort zone" mode is achieved through the provision of pawl releasing cam means in a different and novel manner as compared to that in the prior embodiment. Before explaining the same, it should be understood by those skilled in the art that the spring wire cam 280, with its lobes 281 and 282 act on pawl 371 during normal protraction and retraction of the belt as aforedescribed.

As particularly contemplated within the invention of the present exemplary embodiment, the means for deactivating pawl 371 to reapply the main bias of the rewind spring has the capability of providing an extended "comfort zone" mode for the safety belt of well in excess of one full revolution of the spool.

Pawl release cam means, in the present exemplary embodiment, indicated generally at 390, and as best seen in FIGS. 13 and 14, comprise a cam disc 391 mounted by an inner aperture 392 on boss 333' formed integrally of cover 331. Disc 391 is free to rotate relative to cover boss 333 and thus relative to ratchet 320 and spool shaft 25. Cam disc 391 is provided with a camming surface about its exterior which includes a cam ramp portion 393. Pawl 371 is provided with a cam follower roller 375 which is adapted, as explained more fully hereinafter, to roll up ramp surface 393 to remove pawl tooth 373 from engagement with teeth 321 of ratchet 320.

Assuming that a "comfort zone" mode has been accomplished via a slight retractive movement of the safety belt, moving spring wire cam 280 to the position of FIG. 13, pawl 371 engages its tooth 373 with ratchet 320. A "comfort zone" mode for the retractor is thus in effect as described with regard to the prior embodiments. As gears 332 and 350 rotate counterclockwise in FIG. 13, during belt retraction under the lower tension, as when a passenger settles back in his seat, the pawl 371 moves freely about cam 391 until it reaches the position of FIG. 16 where cam follower roller 375 begins to ride up cam ramp portion 393. Since cam disc 391 is freely rotatable relative to its journal, cover boss 333, it will then rotate with continued counterclockwise movement of pawl 371, along with its carrier member, gear 350, until stop surface 394 on cam disc 391 engages cam stop 395 as seen in FIG. 17. As best seen in FIG. 15, cam stop 395 is provided on cover 331 and may be formed integrally thereof. While the body portion of cam disc 391 passes stop 395 freely, as seen in FIG. 15, the projecting cam ramp portion 393 prevents a stop surface 394 which abuts stop 395 as seen in FIG. 17 limiting further counterclockwise rotation of the pawl release cam.

As seen in FIG. 17, continued counterclockwise rotation of pawl 371 along with its carrier, gear 350 in the exemplary embodiment, due to continued spool rewinding under the low tension mode, will cause cam follower roller 375 to ride up the now stationary cam ramp portion 393 releasing pawl tooth 373 from teeth of the ratchet 320 and thus deactivating the low tension producing means and reapplying the main rewind bias of spring 340 upon the spool through shaft 25.

Means are provided for returning the pawl release cam, indicated generally at 390 back to an initial or start position upon clockwise rotation of the pawl carrier, gear 350 in the present embodiment. As seen in FIG. 13, gear 350 is provided with an abutment 356 which is adapted to engage arm 396 provided on cam disc 391.

During the "comfort zone" mode of operation as aforedescribed, gear 350 moves counterclockwise in FIG. 13 moving abutment 356 away from arm 396, as seen in FIG. 16. As described before, pawl follower roller 375 will cause cam disc 391 to rotate along with the pawl carrier, gear 350, in the position of FIG. 16 to that of FIG. 17 thus holding the relative arcuate separation of abutment 356 and arm 396 as seen in FIG. 16 until disc 391 engages stop 395. However, with continued counterclockwise rotation of gear 350, as seen in FIG. 17, the pawl 371 is released before abutment 356 can come into engagement with the rear side of arm 396. On release of pawl 371 from ratchet 320, pawl carrier, gear 350, will rotate clockwise bringing abutment 356 full circle around on the left hand side of arm 396, as viewed in FIG. 17, and move it in a clockwise direction, as seen in FIG. 13, until the members come around to stop 395. From the foregoing, it can be seen that the pawl carrier, gear 350, may rotate almost two full revolutions between an initial pawl lock up with ratchet 320, initiating a "comfort zone" mode and a pawl release condition as seen in FIG. 17.

It should be apparent to those skilled in the art, from a consideration of the prior detailed description of preferred exemplary embodiments of the present improvement in means for providing an extended "comfort zone" mode of operation for a safety belt retractor having a low tension mode that the objects and advantages stated hereinbefore for the within invention have been attained. An extended "comfort zone" mode of operation for the retractor wherein the spool may move in excess of one full revolution, or more, has been disclosed in the environment of exemplary embodiments enjoying the advantage of a single spring arrangement with means for applying a back torque upon the spool emmanating from the spring through exemplary gearing and/or pulley means to effect a reduced belt tension condition when the belt is in use. It is further contemplated that the present improvements in extended "comfort zone" means may be employed with other types of retractors employing means for providing a reduced tension effect when in a "comfort zone" mode and it should be understood by those skilled in the art that various other alternatives, modifications and adaptations of the within invention may be made within the scope and spirit of the present invention which is defined by the following claims.

I claim:

1. In a safety belt retractor having a belt storage spool and a spool rewind spring for biasing said spool in a belt rewind direction, the improvement in means for reducing the tension applied to the belt when in use relative to the normal bias of said rewind spring, comprising the provision of:

means for providing a reduced rewind bias on said spool to provide a reduced tension on said belt;

means for activating said means for providing a reduced rewind bias in response to spool rotation in a predetermined manner and means for deactivating said means for providing a reduced rewind bias in response to spool rotation in a belt rewind direction of more than one full revolution under the influence of said reduced tension which is unrelated to the amount of belt unwound from said spool beyond an initial unwinding of an amount at least equal to said spool rotation in a belt rewind direction.

2. The retractor of claim 1 wherein said means for deactivating operates in response to spool rotation of between one and two full revolutions of said spool.

3. The retractor of claim 1 wherein said rewind spring has one end connected to said spool and said means for providing a reduced rewind bias on said spool comprises:
- means for selectively connecting an opposite end of said rewind spring to said spool, said means for selectively connecting including means for providing an opposite biasing effect on said spool of a lesser amount than that applied by said one end on said spool.

4. The retractor of claim 3 wherein said means for selectively connecting comprises:
- a first member rotatably mounted and connected to an opposite end of said spring;
- a second member rotatably mounted;
- means for connecting said second member to said spool, said means for connecting including pawl means on said second member and ratchet means connected to said spool;
- torque reducing means interconnecting said members for reducing torque applied by said first member through said reducing means to said second member; and
- said means for deactivating said means for providing a reduced rewind bias comprises:
- pawl release camming means driven by said first member and aligned to release said pawl from engagement with said ratchet wheel upon concurrent rotation of said first and second members in a spool rewind direction but at different speeds due to said torque reducing means interconnection.

5. The retractor of claim 4 wherein said pawl release camming means comprises:
- a cam member mounted to said first member and presenting cam surfaces to a cam follower connected to said pawl on said second member.

6. The retractor of claim 5 wherein:
- said first member is a first ring gear;
- said second member is a second ring gear; and said torque reducing means comprises reduction gear means interconnecting said first and second gear and giving said first gear a mechanical advantage over said second gear.

7. The retractor of claim 6 wherein:
- said first member is a first pulley means rotatably mounted on said retractor and connected to said spring second end;
- said second member is a second pulley means connectable to said spool and having a smaller working diameter than that of said first pulley means; and
- said torque reducing means comprises belt means interposed between said first pulley means and said second pulley means for transferring torque applied by said first pulley means to said second pulley means.

8. In a safety belt retractor having a belt storage spool and a spool rewind spring for biasing said spool in a belt rewind direction, the improvement in means for reducing the tension applied to the belt when in use relative to the normal bias of said rewind spring, comprising the provision of:
- means for providing a reduced rewind bias on said spool to provide a reduced tension on said belt, wherein said means for providing a reduced rewind bias on the spool comprises back torque applying means for selectively applying a portion of the rewind torque of the rewind spring back on to said spool in a belt unwinding direction to produce a reduced torque effect upon said spool;
- means for activating said means for providing a reduced rewind bias in response to spool rotation in a predetermined manner; and
- means for deactivating said means for providing a reduced rewind bias in response to spool rotation in a belt rewind direction of more than one full revolution under the influence of said reduced tension.

9. The retractor of claim 8 wherein said means for activating said means for providing a reduced rewind bias comprises:
- means for operating said back torque applying means in response to a slight retraction movement of said belt following an initial protraction thereof.

10. The retractor of claim 8 wherein said back torque applying means comprises:
- a ring gear rotatably mounted to said retractor and having said spring second end attached thereto in driving relation;
- a second gear rotatably mounted to said retractor and mounting pawl means engagable with a ratchet means on said spool; and
- stepped gear means interposed between said ring gear and said second gear for providing a mechanical advantage to said second gear.

11. The retractor of claim 10 comprising:
- cam means frictionally driven off of rotation of said spool for selectively blocking said pawl from engaging said spool ratchet during protraction of said belt and for allowing engagement of said pawl with said spool ratchet upon a slight retraction movement of said belt following an initial protraction thereof.

12. The retractor of claim 11 wherein said means for deactivating said means for providing a reduced rewind bias comprises:
- pawl release camming means driven by said ring gear into engagement with said pawl as said ring gear rotates relative to said second gear due to said stepped gear means interconnection.

13. In a safety belt retractor having a belt storage spool and a spool rewind spring for biasing said spool in a belt rewind direction, the improvement in means for reducing the tension applied to the belt when in use relative to the normal bias of said rewind spring, comprising the provision of:
- means for providing a reduced rewind bias on said spool to provide a reduced tension on said belt, wherein said means for providing a reduced rewind bias on said spool includes a pawl and means for mounting said pawl for rotation concurrent with rotation of said spool when in an activated position due to the operation of said activating means and said spool is biased by said reduced rewind bias;
- means for activating said means for providing a reduced rewind bias in response to spool rotation in a predetermined manner; and
- means for deactivating said means for providing a reduced rewind bias in response to spool rotation in a belt rewind direction of more than one full revolution under the influence of said reduced tension, wherein said means for deactivating said means for providing a reduced rewind bias includes cam means for engaging said pawl during its rotation with said spool and means for rotatively mounting said cam means for limited rotational travel with said pawl on engagement with said pawl and for moving said pawl to a deactivated position when said cam means reaches the end of its limited travel and said pawl continues its travel relative said cam means.

14. The retractor of claim 13 wherein said retractor includes a cover for said means for providing a reduced rewind bias and said means for mounting said cam means includes a boss formed on an inner side of said cover and a cam disc having a central aperture fitted about said boss to rotatably mount said disc thereon.

15. The retractor of claim 14 wherein said cam disc has a cam ramp portion for engaging said pawl and said pawl includes a cam follower roller portion engaged by said ramp.

16. The retractor of claim 15 wherein said cam disc includes a stop surface and said cover includes an abutment stop means for limiting rotation of said disc upon said stop surface engaging said abutment stop means on said cover.

* * * * *

UNITED STATES PATENT OFFICE
CERTIFICATE OF CORRECTION

Patent No. 4,125,231  Dated November 14, 1978

Inventor(s) Cyril Henderson

It is certified that error appears in the above-identified patent and that said Letters Patent are hereby corrected as shown below:

The term of this patent subsequent to

May 31, 1994, has been disclaimed.

Signed and Sealed this

Tenth Day of April 1979

[SEAL]

Attest:

RUTH C. MASON
*Attesting Officer*

DONALD W. BANNER
*Commissioner of Patents and Trademarks*